United States Patent [19]

Kokaram

[11] Patent Number: 5,598,226
[45] Date of Patent: Jan. 28, 1997

[54] REPARING CORRUPTED DATA IN A FRAME OF AN IMAGE SEQUENCE

[75] Inventor: Anil C. Kokaram, Cambridge, United Kingdom

[73] Assignee: AVT Communications Ltd., London, England

[21] Appl. No.: 282,901

[22] Filed: Jul. 29, 1994

[30] Foreign Application Priority Data

Aug. 4, 1993 [GB] United Kingdom ................... 9316153

[51] Int. Cl.⁶ ........................................................ G06K 9/00
[52] U.S. Cl. ........................... 348/607; 382/274; 382/275
[58] Field of Search ..................................... 382/260, 264, 382/270, 232, 236, 238, 239, 251, 252, 254, 274, 275, 276, 293; 348/620, 618, 619, 607

[56] References Cited

U.S. PATENT DOCUMENTS

| | | | |
|---|---|---|---|
| 4,329,708 | 5/1982 | Yamaoto et al. | 358/36 |
| 4,838,685 | 6/1989 | Martinez et al. | 352/85 |
| 4,907,287 | 3/1990 | Homma et al. | 382/54 |
| 4,989,087 | 1/1991 | Pele et al. | 358/136 |
| 5,134,480 | 7/1992 | Wang et al. | 358/140 |
| 5,200,820 | 4/1993 | Gharavi | 358/105 |
| 5,224,141 | 6/1993 | Yassa et al. | 378/99 |

FOREIGN PATENT DOCUMENTS

| | | |
|---|---|---|
| 2021363 | 11/1979 | United Kingdom . |
| 2139039 | 10/1984 | United Kingdom . |
| 2188510 | 9/1987 | United Kingdom . |
| 2263373 | 7/1993 | United Kingdom . |

OTHER PUBLICATIONS

M. Bierling, "Displacement Estimation by Hierarchical Blockmatching", *SPIE vol. 1001 Visual Communications and Image Processing*, 942–951 (1988).

J. M. Boyce, "Noice Reduction of Image Sequences Using Adaptive Motion Compensating Frame Averaging", *IEEE ICASSP*, vol. 3, pp. 461–464 (1992).

W. Enkelmann, "Investigations of Multigrid Algorithms for th Estimation of Optical Flow Fields in Image Sequences", *Computer Vision, Graphics, and Image Processing*, 43, pp. 150–177 (1988).

M. Ghanbari, "The Cross–Search Algorithm for Motion Estimation", *IEEE Transactions on Communications*, vol. 38, No. 7, pp. 950–953 (1990).

A. Zaccarin et al., "Fast Algorithms for Block Motion Estimation, " *IEEE ICASSP*, vol. 3, pp. 449–452 (1992).

A. Kokaram et al., "A System for the Removal of Impulsive Noise in Image Sequences", *SPIE Visual Communications and Image Processing*, pp. 322–331, (Nov. 1992).

A. Kokaram et al., "Detection and Removal of Impulsive Noise in Image Sequences", *Singapore International Conference on Image Processing*, pp. 629–633 (Sep. 1992).

R. D. Morris et al., "Detection and Correction of Speckle Degradation in Image Sequences Using a 3D Markov Random Field", *Proceedings of the International Conference on Image Processing: Theory and Applications*, IPTA (1993) no page number.

(List continued on next page.)

*Primary Examiner*—Leo Boudreau
*Assistant Examiner*—Bijan Tadayon
*Attorney, Agent, or Firm*—Schwegman, Lundberg, Woessner & Kluth, P.A.

[57] ABSTRACT

A process for enhancing a frame of an image sequence, the process comprising dividing the frame into a number of blocks and matching the blocks with corresponding blocks in the directly preceding and directly succeeding frames of the sequence to compensate for object motion between frames. Damaged pixels are identified by comparing their actual intensity values with intensity values predicted by an autoregressive process conducted on the motion compensated data. Once identified, the intensity values of the damaged pixels are replaced by values interpolated by a further autoregressive process modified to ignore the effects of damaged pixels.

30 Claims, 4 Drawing Sheets

OTHER PUBLICATIONS

R. Storey, "Electronic Detection and Concealment of Film Dirt", *SMPTE Journal*, pp. 642–647 (Jun. 1985).

P. Strobach, "Quadtree–Structured Linear Prediction Models for Image Sequence Processing", *IEEE Transactions on Pattern Analysis and Machine Intellience*, vol. II, No. 7 (Jul. 1989) no page number.

S. Efstratiadis et al., "A Model–Based Pel–Recursive Motion Estimation Algorithm", *IEEE ICASSP*, pp. 1973–1976 (1990).

G. A. Thomas, "Television Motion Measurement for DATV and Other Applications", *BBC Research Department Report* (1987) no page number.

S. V. Vaseghi et al., "Detection and Suppression of Impulsive Noise in Speech Communication Systems", *IEE Proceedings*, vol. 137, Pt. 1, No. 1, pp. 38–46 (Feb. 1990).

R. Veldhuis, "Restoration of Lost Samples in Digital Signals", *Prentice Hall*, pp. 85–109 (1980) no place of publication.

B. Alp et al., "Median–Based Algorighms for Image Sequence Processing", *SPIE vol. 1360 visual Communications and Image Processing*, pp. 133–134 (1990).

G. Arce, "Multistage Order Statistic Filters for Image Sequence Processing", *IEEE Transactions on Signal Processing*, vol. 39, No. 5, pp. 1146–1163 (1991).

G. R. Arce et al., "Motion–Preserving Ranked–Order Filters for Image Sequence Processing", *IEEE Int. Conference Circuits and Systems*, pp. 983–986 (1989).

European Search Report dated 30 Sep. 1994 for European Application No. 94 305 429.6 no page number, author, or title.

Patent Abstracts of Japan, vol. 17, No. 545 (E–1442), 30 Sep. 1993, and JP–A–05 153 573 (Sony Corp.) 18 Jun. 1993. no page number, author, title of public.

Patent Abstracts of Japan, vol. 14, No. 441 (E–981) 20 Sep. 1990 & JP–A–02 172 385 (Canon Inc.) 3 Jul. 1990. no page number, author, title.

REPARING CORRUPTED DATA IN A FRAME OF AN IMAGE SEQUENCE

BACKGROUND

1. Field of the Invention

This invention relates to image processing and is concerned with repairing corrupted data in a frame of an image sequence, e.g. due to dirt or scratches.

2. Description of the Prior Art

An image sequence, such as a motion picture, comprises a plurality of frames which are generally equally spaced in time and each of which represents a snapshot taken at one instant in time. The frames often contain noise which is significant enough to affect picture quality and which may be due to a variety of reasons including transmission errors, conversion errors arising during conversion of the sequence from one format to another, e.g. from 9 mm cine to video, contamination by dirt and scratches. Two broad categories of noise can be identified, global noise and local noise. Global noise, for example Gaussian noise or a generalised blur, results in some alteration of the data in the frame. If the form of the alteration is known it may be possible to improve image quality by producing a simple compensation model which holds true for the entire image sequence. In the case of localised noise however, for example that due to dirt or scratches, the original data is obliterated and replaced by some other random data. This presents an entirely different problem from that presented by global noise. Local noise cannot be predicted and hence cannot be removed with the use of a global type model. The only way in which data corrupted by local noise can be restored is by considering the data which remains intact in the region surrounding the damaged area. The following discussion and description is concerned with the problem of localised noise and the elimination of its effect.

Previous attempts to remove the effects of local noise in image sequences have drawn to a large extent on work in the field of 2-D image restoration. This ignores, however, the valuable information which is contained in frames which precede or succeed a damaged frame which it is desired to restore, i.e. in a third dimension which is time, and which usually contain images which closely correspond to those contained in the damaged frame (unless of course there occurs an abrupt scene change).

Early image sequence restoration work which took advantage of this three dimensional information includes the median filtering method disclosed by G. R. Arce and E. Malaret in an article entitled "Motion preserving ranked-order filters for image sequence processing", IEEE Int. Conference Circuits and Systems, pages 983–986, 1989. This method considered three successive frames of an image sequence and matched an N×N block of pixels in a middle frame with corresponding blocks in the frames on either side to provide a 3×N×N box. The intensity value of the pixel in the centre of the box was replaced by the median pixel value of all the pixels contained in the box. This operation was carried out for each of the pixels comprising the middle frame. The effect of this method is to average out the effects of local noise.

The basic median filtering method disclosed in the above Arce document does not, however, take into account any motion of objects occurring between frames. So, for example, the image pixels contained in the middle block of one of the boxes may be offset with respect to the corresponding image pixels of the blocks on either side, possibly by a significant amount if the image is moving quickly, making the calculated median value too inaccurate to use.

A median filtering method which takes into account the possibility of motion between frames is that suggested by A. Kokaram and P. Rayner in an article entitled "Detection and Removal of Impulsive Noise in Image Sequences", Proceedings of the 2nd Singapore International Conference on Image Processing (SICIP), pages 629–633, 1992. Prior to constructing the boxes from which a median value is calculated, the, possibly many, displacements between the three successive frames are estimated on a pixel by pixel basis. The middle block is then matched with the corresponding and possibly displaced block of each of the frames on either side so that the median filtering operation acts on data which is substantially motion compensated.

The above referenced SICIP article also proposes activating the filter only in those locations where an error is believed to exist. If this approach is not taken the filtering tends to remove local noise only at the expense of a general degradation of the entire frame. The method disclosed in the SICIP article compares the intensity value of pixels contained in corresponding locations after motion compensation. A large difference between the compared values indicates the presence of local noise and only then is the median filter applied to repair the damage.

SUMMARY OF THE INVENTION

According to a first aspect of the present invention there is provided a method of repairing a damaged pixel in a current frame f of an image sequence having a plurality of frames, the method comprising replacing the value $I(x,y,f)$ of the damaged pixel with a corrected value obtained by a process using an autoregression model involving the values of pixels in a zone containing the damaged pixel and located in the current frame and in substantially the same zone of a motion compensated frame preceding and/or succeeding the current frame in the image sequence.

(By an autoregression process is meant a process of predicting a value of a pixel from a linear weighted combination of the values of pixels in some region surrounding that pixel.)

Whilst in a preferred embodiment of the first aspect the autoregression model involves the values of pixels located in the frame directly preceding and/or directly succeeding the current frame in the image sequence it will be appreciated that, in some circumstances, it may be appropriate to additionally or alternatively use pixels located in other frames.

The location of a damaged pixel of a frame may be identified by correlating pixels of that "current" frame with the same, or corresponding, elements of preceding and/or succeeding frames. Thus, according to a second aspect of the present invention, there is provided a method of detecting a damaged pixel in a current frame f of an image sequence having a plurality of frames, the method comprising evaluating the magnitude of the difference $\epsilon(x,y,f)$ between the actual intensity value $I(x,y,f)$ of a current frame test pixel and a predicted intensity value $\hat{I}(x,y,f)$ for the test pixel by a process using an autoregression model involving the intensity values of pixels in a zone containing the test pixel and located in both the current frame and in substantially the same zone of a motion compensated frame preceding and/or succeeding the current frame and comparing the difference to a threshold error value $\epsilon_t$.

The autoregression modelling process, which is used to obtain a corrected value as set out in the above first aspect of the invention, may take advantage of the known location of the damaged pixels, identified for example by a method according to the above second aspect, to weight those pixels so that they have no effect on the process.

It is often the case that a damaged pixel in a frame which is identified as such is surrounded by elements which are also degraded but not to such an extent as to make them identifiable to the process set out above. In order to take this situation into account, the image processing method may include a dilation step which flags as damaged pixels surrounding the identified damaged pixels. Preferably only the pixels directly adjacent the identified damaged pixels are so flagged.

In certain embodiments of the above first and second aspects of the present invention motion compensation between frames may be according to the above SICIP article. However, there is an alternative method.

Thus, according to a third aspect of the present invention there is provided a method of estimating image displacement between two frames of an image sequence, wherein each frame comprises an array of pixels having intensity values, the method comprising calculating the mean absolute error $MAE_0$ between a block in a first of the frames and a block in the same, or corresponding, location in the second of the frames, calculating the mean absolute error $MAE_m$ between the first block in the first frame and a plurality of blocks of a search region of m blocks in the second frame and which region contains the second block, each of the m blocks having an offset from the second block in the second frame, identifying which of said plurality of searched blocks of the search region in the second frame gives rise to the minimum $MAE_m(MAE_{min})$ and, if $r*MAE_{min} \leq MAE_0$ where r is a constant greater than 1, assigning to the first block, in the first frame, a displacement vector corresponding to said offset of the identified block. The invention also relates to apparatus for carrying out image processing. Thus, according to a fourth aspect of the present invention there is provided apparatus for repairing a damaged pixel in a current frame of an image sequence having a plurality of frames, the apparatus being arranged to replace the value of the damaged pixel with a corrected value and comprising means for obtaining the corrected value by a process using an autoregression model involving the values of pixels in a zone containing the damaged pixel and located in the current frame and in substantially the same zone of a motion compensated frame preceding and/or succeeding the current frame in the image sequence.

According to a fifth aspect of the present invention, there is provided apparatus for detecting damaged pixels in a current frame of an image sequence having a plurality of frames, the apparatus being arranged to evaluate the magnitude of the difference between the actual intensity value of a current frame test pixel and a predicted intensity value for the test pixel and comprising means arranged to evaluate said magnitude by a process using an autoregression model involving the intensity values of pixels in a zone containing the test pixel and located in both the current frame and in substantially the same zone of a motion compensated frame preceding and/or succeeding the current frame and means for comparing the difference to a threshold error $\epsilon_t$.

According to a sixth aspect of the present invention there is provided an apparatus for estimating image displacement between two frames of an image sequence, wherein each frame comprises an array of pixels having intensity values, the apparatus comprising means arranged to calculate the mean absolute error $MAE_0$ between a first pixel block in a first of the frames and a second pixel block in the same, or corresponding, location in the second of the frames, means arranged to calculate the mean absolute error $MAE_m$ between the first pixel block in the first frame and a plurality of pixel blocks of a search region of m blocks in the second frame and which region contains the second block, each of the m blocks being offset from the second block in the second frame, means arranged to identify which of said plurality of searched blocks of the search region in the second frame gives rise to the minimum $MAE_m(MAE_{min})$ and, if $r*MAE_{min} \leq MAE_0$ where r is a constant greater than 1, means arranged to assign to the first block, in the first frame, a displacement vector corresponding to said offset of the identified block.

Apparatus embodying one or more of the above fourth to sixth aspects of the invention may be arranged to carry out any one of the methods set out in the attached claims.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION

Figure 1:
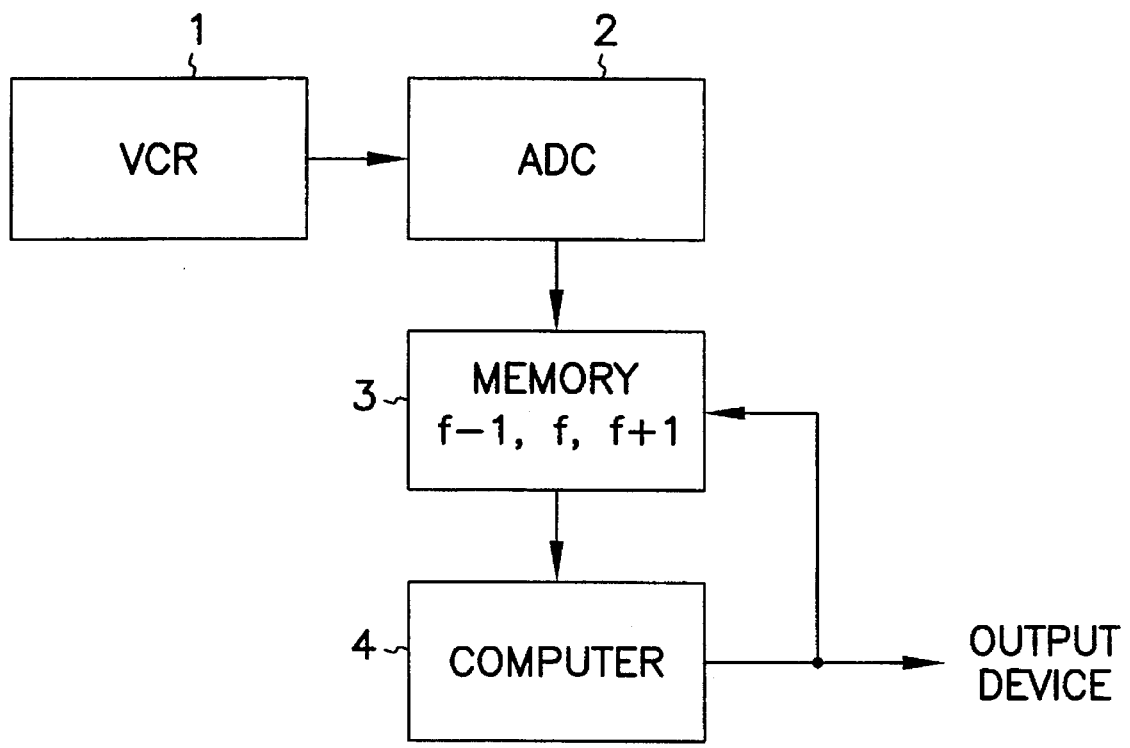
FIG. 1 is a block diagram of a system for removing noise from an image sequence.

FIG. 1 is a block diagram of a system suitable for carrying out the embodiment of the invention now to be described. It comprises an analogue to digital converter 2 for digitising an analogue input signal representing an image sequence comprising a plurality of frames, supplied by a VCR 1, a memory 3 for storing pixel location and intensity for three consecutive frames, f−1, f, and f+1, of the input image sequence in digital form, and a computer 4 for processing the currently stored frame f of the image sequence. After each cycle, the most recently processed frame f is fed back to the memory as frame f−1 for the next cycle, frame f+1 is designated frame f, and a new frame, which then becomes f+1, is read into the memory via the analogue to digital converter. The most recently processed frame f may be supplied in digital form to a digital memory device which retains all of the processed frames for use later or may be passed through a digital to analogue converter to an analogue storage device, e.g. a further VCR, or directly to a display.

The frames f−1, f, and f+1 are stored in the memory as 2-D arrays of intensity values, the address of the intensity values in memory corresponding to the location of the corresponding pixel in the image frame.

It will be appreciated that the input sequence could convey information additional to intensity values, for example colour information, but, in the interest of clarity, such considerations will be omitted in the following and the discussion limited to black and white signals.

The main steps of the embodiment can be set out as follows:

1) Divide frame f into a plurality of blocks containing equal numbers of pixels.

2) Match the blocks with corresponding blocks in frames f−1 and f+1 using a motion estimation process.

3) Extract a data volume including frame f and at least one of the frames f−1 and f+1, where frames f−1 and f+1 have been compensated for motion, and, using a 3D-autoregression process, generate a prediction intensity error for each pixel in frame f.

4) Identify damaged areas of frame f by comparing the predicted errors with a threshold error.

5) Replace the pixel intensity values in the damaged areas with values interpolated by a 3D-autoregression process involving the intensity values of surrounding pixels.

Considering firstly steps 1) and 2), a motion estimation method is used which assigns, in the current frame, to each pixel or cluster of pixels (having coordinates x,y) two displacement vectors $d_{f-1}(x,y,f)$ and $d_{f+1}(x,y,f)$ which define respectively the displacement of that pixel or cluster between the current and preceding frame and between the current and the succeeding frame respectively.

Figure 2:
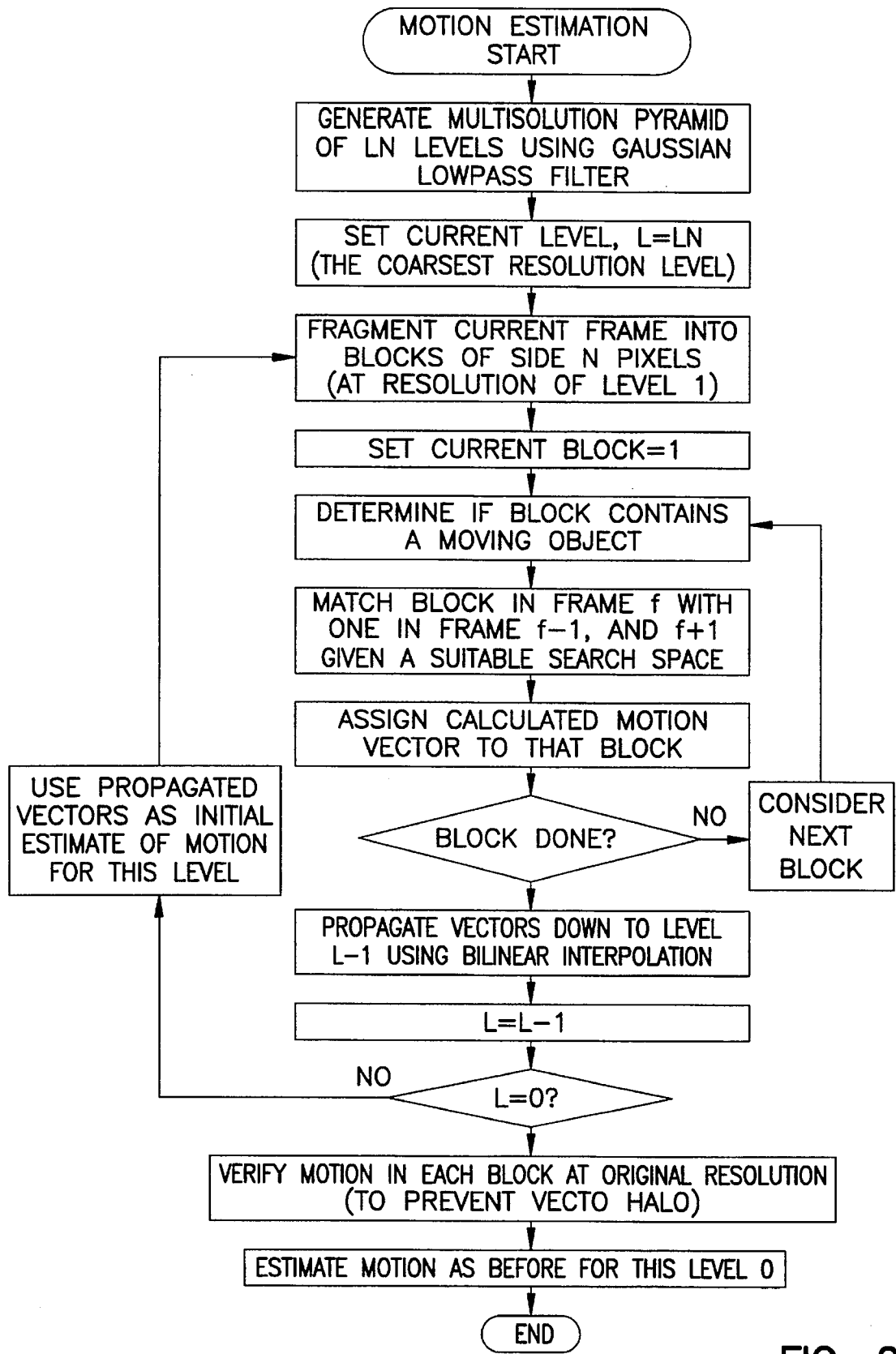
FIG. 2 is a flow diagram for the motion estimation process.

In order to reduce the computational complexity of this process, a multiresolution technique is used which involves generating a number of sublevels L1, L2, L3 . . . Ln (and where L0 represents the level of the original frame) of gradually reduced resolution for each of the three frames. FIG. 2 is a flow diagram showing the steps involved. A first estimate of displacement is obtained from a coarse, or low resolution, level Ln. A second improved estimate is obtained from a higher resolution level Ln-1 using the first estimate to reduce the area which must be searched to match areas of the current frame f with corresponding areas of the surrounding frames f−1 and f+1. The estimate is further improved by considering still higher resolution levels until finally a satisfactory estimate is obtained. In the embodiments now to be described n=3.

Level L1 is generated by operating on the original frame with a low pass filter, i.e. in effect passing a low pass filter mask of given window size over the original frame (which corresponds to level L0). The mask is placed over a portion of the frame to be processed and a value is then generated which is a function of the value of pixels in the area extracted by the mask window. The generated value corresponds to the pixel located in the centre of the mask window and is stored in a new array.

A suitable filtering function is a Gaussian function having the following form:

$$f(p,q) = w(p,q) \frac{1}{A} \exp^{-(\frac{r^2}{2\sigma^2})} \quad (1)$$

so that the intensity value generated is $$I_f(0,0) = \sum_{p=-R}^{R} \sum_{q=-R}^{R} f(p,q)I(p,q) \quad (2)$$

where $$r = \sqrt{(p^2 + q^2)},$$

$$w(p,q) = \begin{bmatrix} 1 & \text{for } p^2 + q^2 \leq R^2 \\ 0 & \text{otherwise} \end{bmatrix}$$

$$A = \sum_{|p|=0}^{R} \sum_{|q|=0}^{R} w(p,q) \exp^{-(\frac{r^2}{2\sigma^2})}$$

and p and q are the local coordinates of pixels within the mask window and the pixel at the centre of the window defines the origin (0,0) of the local coordinate system. For a filter window of 9×9 pixels, R=4 and p and q are in the range −4 to +4. σ is a constant defining the Gaussian function. The mask is moved pixel by pixel across the entire frame until the new array is completely filled. Level L0 is extended at its edges by a strip of pixels having intensity values equal to zero, i.e. black, so that the filter mask can be applied to the pixels around the edges. The resulting filtered frame is subsampled in both the horizontal and vertical directions by a factor of two, i.e. only every other pixel is used in each row of the processed level L0. The result is a frame at level L1. Thus, if the original frame comprises an array of 256×256 pixels, level L1 would comprise a smaller array of 128×128 pixels providing an image which is slightly blurred in comparison to the image provided by level L0 and which has in effect a lower resolution. The process of filtering and subsampling is then carried out on level L1 to produce a level L2 having 64 ×64 pixels and finally on level L2 to produce a level L3 having 32×32 pixels.

In order to obtain the displacement vectors $d_{f-1}(x,y,f)$ the levels L3 of frames f−1 and f are first subdivided into a number of corresponding A×A pixel blocks. For example, if A=2 each level L3 contains 256 blocks and for each block the following procedure is followed.

(a) Considering a block B(f) within level L3 of frame f, having its upper left corner located at the pixel (i,j), the intensity values of the pixels within the block can be written as I(i,j,f), I(i,j+1,f), I(i+1,j,f), and I(i+1,j+1 ,f). The intensity values of the pixels within the same block B(f−1 ) of frame f−1 can similarly be written as I(i,j,f−1) etc. The mean absolute error between these two blocks is calculated as follows:

$$MAE_0 = \frac{1}{4} \sum_{s=0}^{1} \sum_{t=0}^{1} |I(i+s,j+t,f) - I(i+s,j+t,f-1)| \quad (3)$$

If the mean absolute error $MAE_0$ between these two blocks is less than some threshold value $MAE_t$ (if the pixel intensity is measured on a scale of 0 to 255 a suitable threshold value is 8) then the block is assumed not to be undergoing motion and the displacement vector of the block is stored as [0,0]. However, if $MAE_0$ exceeds $MAE_t$ then the block B(f) might be in motion so a search of the region surrounding the initial block B(f−1 ) in frame f−1 is commenced.

Figure 3:
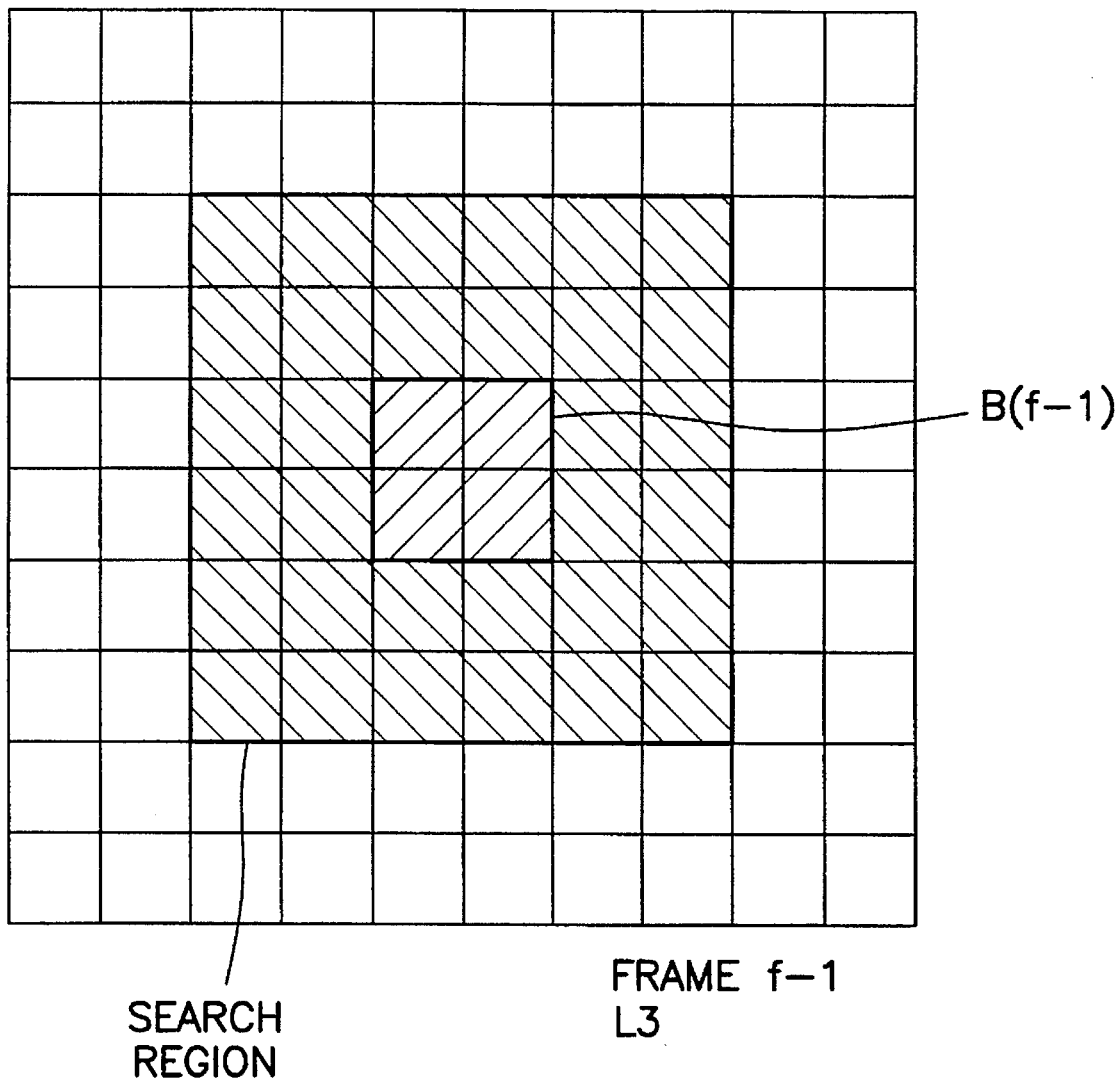
FIG. 3 shows an example of the search region used in the process of FIG. 2.

(b) Considering FIG. 3, which shows a portion of level L3 of frame f−1, the search region is chosen to be a 6×6 block of pixels in frame f−1 centred on the block B(f−1 ). The mean absolute error $MAE_m$ between the block in the current frame and each of the m=14 possible 2×2 blocks in the search region (this excluding block B(f−1 ) for which the calculation has already been carried out) is calculated. If the minimum $MAE_m$ obtained (defined as $MAE_{min}$) is not sufficiently less than $MAE_0$, i.e. if $r*MAE_{min} > MAE_0$ where r is a real number greater than 1, then, in order to avoid noise giving rise to spurious matches which do not represent true motion in the image sequence, the displacement vector is set to [0,0]. (The threshold factor r may be user definable in order to allow for varying levels of background noise.) However, if $r*MAE_{min} \leq MAE_0$, then the offset from the block B(f−1 ) of the block giving rise to $MAE_{min}$ is stored as the displacement vector to the block B(f). It is noted that the displacement vector for a given block within level L3 can be defined as the displacement vector $d_{f-1}L3(p,q,f)$ for each of the pixels within the block as those pixels are assumed to be subject to the same displacement.

(c) Once a displacement vector has been stored to all the A×A blocks in level L3 of frame f, whether [0,0] or not, the displacement vectors are propagated to the 64×64 pixels of level L2 as follows:

$$d_{f-1}L2(2x, 2y,f) = 2d_{f-1}L3(x,y,f)$$

The displacement vectors for those pixels in level L2 which are not assigned a displacement vector by this operation, i.e. every second pixel, are obtained from a bilinear interpolation of, or averaging of, the displacement vectors of the directly adjacent pixels.

(d) For level L2, the motion estimation process of steps (a) and (b) is repeated except that the initial search region in frame f−1 is offset by the corresponding displacement vector propagated down from level L3. The displacement vectors obtained from level L2 are propagated down to level L1 by repeating step (c).

(e) Steps (a) to (d) are in turn repeated to generate displacement vectors for level L0, where $d_{f-1}L0(x,y,f)=d_{f-1}(x,y,f)$. On completion of this operation all 256×256 pixels (in A×A blocks) of level L0 have been assigned a displacement vector.

Before the final bilinear interpolation step is carried out for level L0 however, the displacement vector field propagated from level L1 is checked for so-called motion haloes. This is achieved by repeating the process of step (a) for all the blocks of level L0 without taking into account the propagated displacement vectors. If $MAE_0$ with no motion compensation is less than $MAE_0$ with motion compensation then the pixels of the block are assigned a displacement vector of [0,0] and the propagated displacement vector is ignored. This prevents stationary background regions from being assigned erroneous displacement vectors.

A similar process is carried out on the current and succeeding frames f and f+1 in order to obtain the forward displacement vectors $d_{f+1}(x,y,f)$;

Steps 3 and 4 as outlined above are then carried out to detect local noise, for example dirt and sparkle, using the motion compensated data. A 3D autoregression (AR) process is used for detection and it relies on the fact that the intensity value, or grey scale value, of a pixel in an image can be predicted using a linear combination of the intensity values of pixels in a region, termed the support region, surrounding the pixel whose intensity value is to be predicted.

Figure 4:
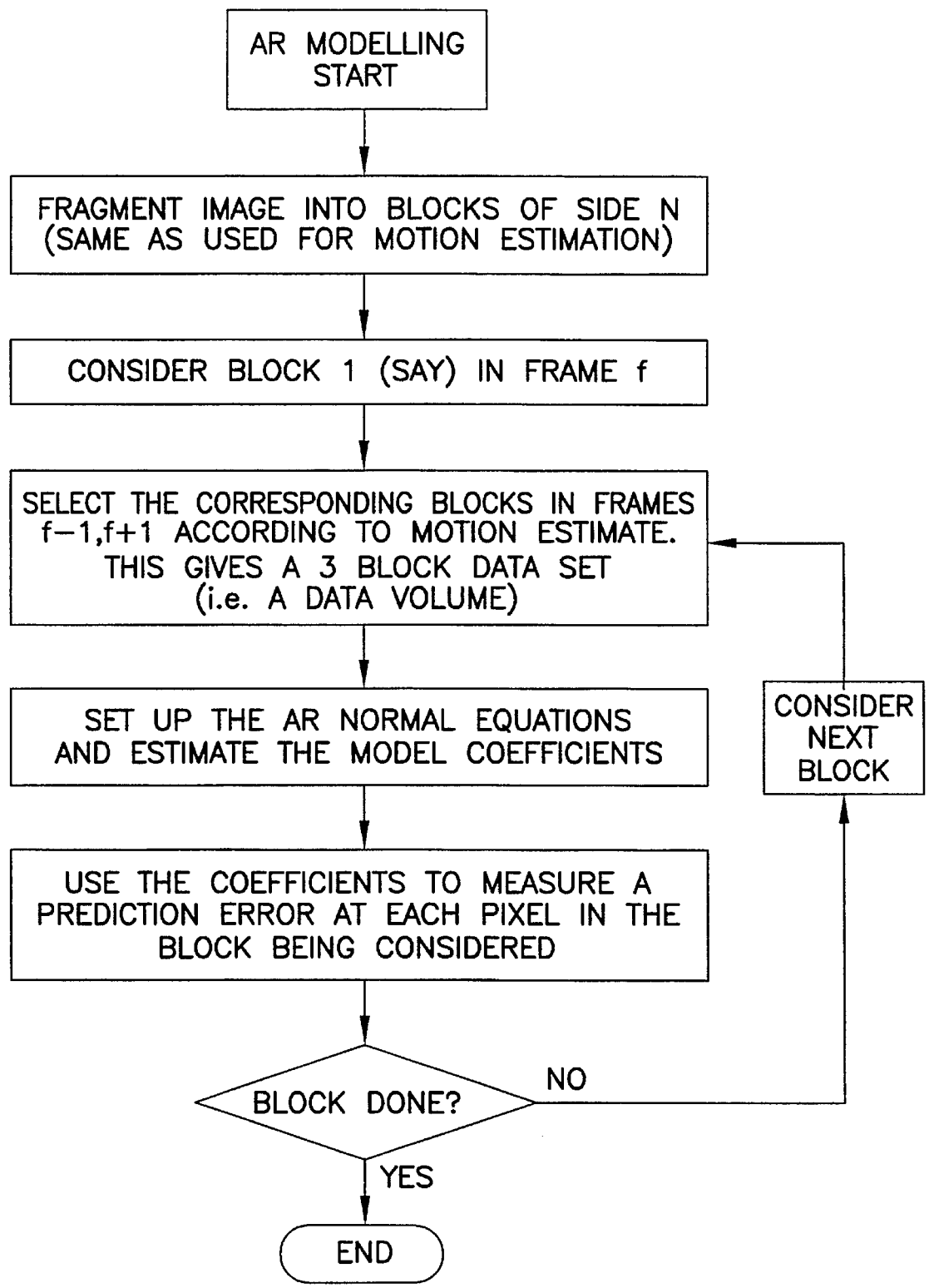
FIG. 4 is a flow diagram for the damage detection process.

FIG. 4 is a flow diagram setting out the main steps in the process. A general formulation of the 3D-AR process is as follows:

$$\hat{I}(x,y,f) = \sum_{k=1}^{M} a_k I[x + q_k(x), y + q_k(y), f + q_k(f)] \quad (4)$$

where $\hat{I}(x,y,f)$ is the predicted intensity value of a pixel located at coordinates (x,y) in frame f, M is the number of pixels in the support region, $a_k$ is a weighting coefficient, and $q_k(x)$, $q_k(y)$ and $q_k(f)$ are the offset vectors in the x direction, the y direction, and with respect to frame number respectively which define the location of the pixels comprising the support region. The prediction error $\epsilon$ of a pixel is the difference between the predicted intensity value and the actual intensity value of the pixel and is defined as follows:

$$\epsilon(x,y,f) = I(x,y,f) - \sum_{k=1}^{M} a_k I[x + q_k(x), y + q_k(y), f + q_k(f)] \quad (5)$$

once $\epsilon$ has been obtained as set out hereinbelow it is compared to a threshold error value $\epsilon_t$. If $\epsilon > \epsilon_t$ then the pixel in question is flagged as being erroneous.

In order to obtain the prediction error $\epsilon$ for each pixel it is first necessary to calculate the coefficients $a_k$. This is done by dividing the data space containing the three frames into a number of data volumes each comprising corresponding, motion compensated, N×N pixel blocks in each of the three frames f−1, f, and f+1 (where N×N>M). N is chosen so that the N×N blocks contain a substantially homogeneous portion of the image.

The displacement vectors $d_{f-1}(x,y,f)$ and $d_{f+1}(x,y,f)$ previously obtained are incorporated into the offset vectors q such the 3D-AR process operates on a data volume as if that volume did not contain any moving components.

By way of example consider one data volume comprising a 3×3×3 box of pixels in the three frames with each pixel chosen to have a support region comprising M=2 pixels, i.e. there are two coefficients $a_1$ and $a_2$. These two pixels may be, for example, the pixel (x−1,y,f) to the left in the current frame and the pixel (x,y,f−1) in frame f−1. The 3D-AR process selects those values of $a_1$ and $a_2$ which minimise the mean value of the squared prediction error in the data volume. This mean value is known as the 'expected value' and, from equation (5), can be written as;

$$E[\epsilon^2(x,y,f)] = E[(I^2(x,y,f) - 2a_1 I(x,y,f)I(x-1,y,f) - \quad (6)$$
$$2a_2 I(x,y,f)I(x,y,f-1) + a_1^2 I^2(x-1,y,f) +$$
$$2a_1 a_2 I(x-1,y,f)I(x,y,f-1) +$$
$$a_2^2 I^2(x,y,f-1))]$$

The minimum of the expected value is found by setting its derivatives w.r.t $a_1$ and $a_2$ to 0, i.e.

$$\frac{\partial}{\partial a_1} E[\epsilon^2(x,y,f)] = -2E[I(x,y,f)I(x-1,y,f)] + \quad (7)$$
$$2a_1 E[I^2(x-1,y,f)] +$$
$$2a_2 E[I(x-1,y,f)I(x,y,f-1)]$$

$$\frac{\partial}{\partial a_2} E[\epsilon^2(x,y,f)] = -2E[I(x,y,f)I(x,y,f-1)] + \quad (8)$$
$$2a_2 E[I^2(x,y,f-1)] +$$
$$2a_1 E[I(x-1,y,f)I(x,y,f-1)]$$

or, in matrix form, $$\begin{bmatrix} E[I^2(x-1,y,f)] & E[I(x-1,y,f)I(x,y,f)] \\ E[I(x-1,y,f)I(x,y,f-1)] & E[I^2(x,y,f-1)] \end{bmatrix} \begin{bmatrix} a_1 \\ a_2 \end{bmatrix} = \quad (9)$$
$$\begin{bmatrix} E[I(x,y,f)I(x-1,y,f)] \\ [I(x,y,f)I(x,y,f-1)] \end{bmatrix}$$

The matrix equation can be solved for $a_1$ and $a_2$. The prediction error e can then be found using equation (5) for each pixel in the N×N block of frame f. For a support region containing M pixels and a data volume including a central N×N pixel block with its upper left corner located at $(x_1, y_1)$, equation (9) can be generalised as:

$$Ca = -c \quad (10)$$

where $$a = [a_1, a_2 \ldots a_M]^T$$

$$\underline{C} = \begin{bmatrix} C(q_1,q_1) & C(q_1,q_2) & & C(q_1,q_M) \\ C(q_2,q_1) & C(q_2,q_2) & \ldots & C(q_2,q_M) \\ C(q_3,q_1) & C(q_3,q_2) & \ldots & C(q_3,q_M) \\ \cdot & \cdot & \cdot & \cdot \\ \cdot & \cdot & \cdot & \cdot \\ \cdot & \cdot & \cdot & \cdot \\ C(q_M,q_1) & C(q_M,q_2) & \cdots & C(q_M,q_M) \end{bmatrix}$$

$$c = [C(q_0,q_1) \, C(q_0,q_2) \ldots C(q_0,q_M)]$$
$$q_0 = [0,0,0]$$

and $q_1$ to $q_M$ are the offset vectors for the M pixels in the support region.

$$C(q_a, q_b) = \frac{1}{N^2} \sum_{x=x_1}^{x_1+N} \sum_{y=y_1}^{y_1+N} |I(x + q_a(x), y + q_a(y), n + q_a(n)) \times$$

$$I(x + q_b(x), y + q_b(y), n + q_b(n))|$$

This process is carried out for all the data volumes into which the three frame data space has been divided until all of the pixels in the current frame f have been tested. The results are contained in an error array $D(x,y)$, where a 0 entry indicates a pixel which is undamaged and a 1 entry indicates a damaged pixel.

It has been found that good results can be obtained by using two models working in tandem. A first model uses a data volume and support region confined to the frames f and f−1 whilst the second uses a data volume and support region confined to the frames f and f+1. In addition M is set to 1 and $q_1$ for the first model is $d_{f-1}(x,y,f)$ and for the second model is $d_{f+1}(x,y,f)$, i.e. the prediction is made only from the corresponding pixel in the preceding or succeeding frame. The two simplified formulations for the forward ($\epsilon_f$) and backward ($\epsilon_b$) prediction errors, assuming for simplicity that the vectors $q_1$ have been incorporated into the coefficients x and y, can be stated respectively as:

$$\epsilon_f(x,y,f) = I(x,y,f) - a_1 I(x,y,f+1) \qquad (11)$$

and $$\epsilon_b(x,y,f) = I(x,y,f) - a_2 I(x,y,f-1) \qquad (12)$$

Good results with this simplified formulation are gained by setting $a_1$ and $a_2$ to 1. In this simplified formulation the corresponding entry in the error array $D(x,y)$ is flagged only if both $\epsilon_f$ and $\epsilon_b$ exceed $\epsilon_t$.

The 3D-AR model works well in detecting local errors such as dirt and sparkle because a large forward and/or backward prediction error implies that the subject pixel in the current frame cannot be predicted from preceding or succeeding frames and is thus a short temporal discontinuity. Such discontinuities are unlikely to be a deliberate production feature of the image sequence and can therefore reasonably be attributed to dirt or sparkle.

It is often the case that a damaged region of a frame will extend over an area of several pixels with the pixels exhibiting the largest errors lying at the centre of the region. Thus, all damaged pixels are not necessarily detected by the process as so far described in view of the threshold used. Whilst the error of those central pixels may exceed $\epsilon_t$, and thus be flagged as damaged in the error array D, the error of the fringe pixels may not be sufficient for them to have been flagged as damaged. A dilation procedure is therefore carried out to give a pessimistic estimation of the damaged area. This involves flagging, i.e. setting to one, in a copy of the error array D the 8 elements surrounding each of those elements already flagged in the original array D during the error detection process if they are not already flagged. This has the effect, for example, of expanding an isolated error into a 3×3 square and expanding a single line of errors into three adjacent parallel lines in the copy of D.

Before correcting the damaged regions the area over which they extend is determined. In order to replace these regions with corrected values by the method which will be set out hereinafter, a data volume which surrounds each of the damaged areas has to be extracted which contains a sufficient number of undamaged pixels.

An algorithm suitable for sizing the damaged areas is as follows:

```
DEFINE
direction = 0 implies movement (x,y) => (x,y-1)
direction = 1 implies movement (x,y) => (x+1,y-1)
direction = 2 implies movement (x,y) => (x+1,y)
direction = 3 implies movement (x,y) => (x+1,y+1)
direction = 4 implies movement (x,y) => (x,y+1)
direction = 5 implies movement (x,y) => (x-1,y+1)
direction = 6 implies movement (x,y) => (x-1,y)
direction = 7 implies movement (x,y) => (x-1,y-1)
DEFINE
current pixel position = (x_c, y_c)
xmax,ymax,xmin,ymin = the max and min coords of damaged
block traversed
Define current direction = direction
SIZES = array (256,256); i.e. a position for each pixel
of the frame - make every entry 0
BEGIN
10 Scan array D(x,y) in direction = 0 until end of row
then move to next row.
20 If error flagged at pixel (x_c,y_c) then (x_c,y_c) =
(x_c,y_c).
30 Set direction = 2 as there cannot be a damaged pixel
above or to the left.
40 Search from the current direction clockwise and look
in those directions for a pixel which is also set to 1,
i.e. search direction = direction+1,
direction+2 . . . etc.
(Say that the next pixel to be set to 1 is in direction
4. This must be a border pixel because no other pixel
was set until that direction.)
50 Go to that pixel and make it the current one.
(In this case (x_c, y_c) = (x_c,y_c+1))
60 Update xmax,ymax etc
70 Check to see if the current pixel is the start pixel
-if so then goto 100
80 else make the current direction = remainder
((direction+4)/8)
90 GOTO 40
100 STORE size of bounding box in SIZES at position
corresponding to the centre of the bounding box.
110 GOTO 10 until end of array D(x,y)
120 END
```

The resulting array SIZES is an 256 by 256 array containing, at the locations corresponding to the centres of the damaged flagged areas in the error array $D(x,y)$, the maximum lengths of the flagged areas in the x and y directions so as to define a rectangular bounding box around each of the damaged areas.

In order to correct the now identified damaged areas of the current frame f, a process using a 3D-AR model, similar in principle to the process as set out above for detecting the local errors, is applied. An adequate support region for each pixel is provided by the eight surrounding pixel in frame f and the pixel contained in the corresponding motion compensated, 3×3 block in frame f−1, i.e. the number of coefficients M of the model is 17.

In order to calculate the 17 coefficients $a_k$ from which a prediction of the missing data can be made, the array SIZES is scanned for non-zero entries which identify the damaged regions. When each such entry is located a motion compensated data volume is defined around and centred on the damaged area and which extends into adjacent frames of the image sequence. Motion compensation is achieved using the displacement vectors already obtained. Of course the data volume may overlap two or more of the blocks defined in level L0 in which case the motion vector for the data volume (being the same for each pixel within the data volume) is obtained from the four closest level L0 displacement vectors using bilinear interpolation. Whilst separate regions of the data area could be assigned different displacement vectors this would lead to an increase in the complexity of the computation. In any case, as the data volume is selected because of the similarity of the pixels it contains it should be the case that these pixels are moving in a similar manner so that they should each possess a similar displacement vector.

In practice, it has been found to be sufficient to create a data volume containing N×N pixels in the current frame and N×N pixels in a preceding or succeeding frame. The data volume is of a size such that it contains significantly more undamaged pixels than damaged pixels, e.g. a ratio of two to one or, more preferably, five to one.

To obtain the coefficients $a_k$ a matrix equation corresponding to equation (10) can be defined as follows:

$$C_w a = c_w \qquad (13)$$

where $$a = [a_1 \, a_2 \ldots a_M]$$

$$\underline{C_w} = \begin{bmatrix} C_w(q_1,q_1) & C_w(q_1,q_2) & \ldots & C_w(q_1,q_M) \\ C_w(q_2,q_1) & C_w(q_2,q_2) & \ldots & C_w(q_2,q_M) \\ C_w(q_3,q_1) & C_w(q_3,q_2) & \ldots & C_w(q_3,q_M) \\ \vdots & \vdots & & \vdots \\ C_w(q_M,q_1) & C_w(q_M,q_2) & \ldots & C_w(q_M,q_M) \end{bmatrix}$$

$$c = [C_w(q_0,q_1) \, C_w(q_0,q_2) \ldots C_w(q_0,q_M)]$$
$$q_0 = [0,0,0] \text{ and}$$

$$C(q_a,q_b) = \frac{1}{N^2} \sum_{x=x_1}^{x_1+N} \sum_{y=y_1}^{y_1+N} w^2(x,y,f) I(x + q_a(x), y + q_a(y), n + q_n(n)) \times$$

$$I(y + q_b(x), y + q_b(y), n + q_b(n))$$

$$w(x,y,f) = \begin{bmatrix} 1 & D(x,y) = 0 \\ 0 & D(x,y) = 1 \end{bmatrix}$$

The weighting function $w(x,y,f)$ is included in the above equation in order to prevent the damaged pixels from adversely affecting the calculation. It has the effect of making the prediction error equal to zero for the damaged pixels. Equation (13) is solved for the coefficients $a_k$.

It is the case that every pixel within the N×N block of the current frame has an intensity value which is quite well predicted by the weighted linear combination of the M pixels within its corresponding support region (N×N>M). The missing intensity values are those values which bring them into line with the model formulation. This estimation process in the preferred embodiment involves selecting values which minimise the sum squared prediction error over a second data volume lying within the data volume for which the coefficients $a_k$ were obtained. This, however, is just one approach and others may alternatively be used to bring the coefficients into line with the AR model.

In general terms, a prediction error as defined in equation (5) can be written for each pixel within the second data volume. The resulting set of equations can then be written in matrix form as, $$e = Ai \qquad (14)$$

where e is a matrix containing the prediction errors $\epsilon$, A is a matrix containing the model coefficients $a_k$, and i is a matrix containing the pixel intensity values. Equation (14) can be rearranged into the form $$A = a_k i_k + A_u i_u \qquad (15)$$

where $i_u$ and $i_k$ are matrices containing unknown and known intensity value data respectively and $A_u$ and $A_k$ are corresponding coefficient matrices.

Minimising the sum squared prediction error is equivalent to minimising the function $e^T e$, where the superscript T represents the matrix transpose, with respect to the missing data $i_u$. The missing data is therefore that data which satisfies the equation, $$i_u = -[A_u^T A_u]^{-1} A_u^T A_k i_k \qquad (16)$$

The interpolated data can then replace the erroneous data flagged by the error array $D(x,y)$.

Considering the second data volume over which the sum squared prediction error is minimized, it is found that no matter how large this volume is made (bearing in mind that it cannot be larger than the data volume from which the $a_k$ are evaluated as the model is not valid outside of that volume) only a subset of the equations (5) are required. In fact, the only equations required are those which involve at least one unknown pixel intensity value I. For example, if the simple case is considered where the support region for each pixel involves only the corresponding pixel in frame f−1, matrix equation (14) would contain only those prediction error equations for the damaged pixels.

I claim:

1. A method of repairing a damaged pixel, having coordinates x and y, in a current frame f of an image sequence having a plurality of frames, the method comprising: determining a corrected value for the damaged pixel by an autoregression process using an autoregression model in the form of a linear weighted combination of the values of pixels in a zone containing the damaged pixel and located in the current frame and in substantially the same zone of a motion compensated frame preceding and/or succeeding the current frame in the image sequence; and replacing the value I (x,y,f) of the damaged pixel by said corrected value.

2. A method of repairing a damaged pixel in a current frame f of an image sequence having a plurality of frames, the method comprising the steps of:

(a) applying a motion compensation process to at least one of a preceding and a succeeding frame;

(b) selecting a zone in said current frame containing said damaged pixel and a plurality of surrounding pixels;

(c) selecting, using motion compensation data from step (a), substantially the same zone of the at least one of the preceding and succeeding frame, thus to define a three-dimensional support region of pixels;

(d) applying an autoregression process, using an autoregression model in the form of a linear weighted combination of the values of the pixels in the selected region, to determine a corrected value for said damaged pixel; and (e) replacing the value I (x,y,f) of said damaged pixel with said corrected value.

3. A method as claimed in claim 2 wherein in step (d) there is used an autoregression model having M coefficients and said autoregression process comprises defining for a pixel (having coordinates [x,y,f]) in the current frame f said support region having M pixels having intensity values $I_k$ from which a prediction $\hat{I}(x,y,f)$ of the intensity value of the said damaged pixel can be made.

4. A method as claimed in claim 3 wherein said support region contains pixels in at least one of the frames directly preceding and directly succeeding the said current frame.

5. A method as claimed in claim 2 wherein the support region comprises eight pixels in the current frame immediately surrounding the damaged pixel and a corresponding 3×3 pixel block in at least one of the preceding frame and the succeeding frame.

6. A method as claimed in claim 3 wherein the said prediction is made using a linear weighted sum of the values $I_k$ so that:

$$\hat{I}(x,y,f) = \sum_{k=1}^{M} a_k I[x + q_k(x), y + q_k(y), f + q_k(f)]$$

where $q_k(x)$, $q_k(y)$, and $q_k(f)$ are the components which define the position of a $k^{th}$ one of the M pixels of said support region, and the method further comprising the step of choosing the coefficients $a_k$ to minimize a function of prediction error $\epsilon$ over a data volume surrounding the damaged pixel, where $$\epsilon(x,y,f) = I(x,y,f) - \hat{I}(x,y,f)$$

and wherein the function to be minimized is the mean value over the said data volume of the squared prediction error $\epsilon$ for each pixel within the volume.

7. A method as claimed in claim 6 wherein the said data volume is selected to contain substantially more undamaged pixels than damaged pixels.

8. A method as claimed in claim 7 wherein the ratio of undamaged to damaged pixels in the data volume is 5 to 1.

9. A method as claimed in claim 6 wherein the corrected value is chosen to minimise a second function of the prediction error $\epsilon$ over a second data volume, wherein the second function is the sum over the second data volume of the squared prediction error for each pixel within the second data volume.

10. A method as claimed in claim 6 wherein the corrected value is chosen to minimise a second function of the prediction error $\epsilon$ over a second data volume, wherein the second data volume lies wholly within the first data volume.

11. A method as claimed in claim 9 and further comprising the step of setting prediction errors for damaged pixels to 0 when evaluating the function.

12. A method as claimed in claim 2 and further comprising the step of detecting said damaged pixel by evaluating the magnitude of the difference $\epsilon(x,y,f)$ between the actual intensity value $I(x,y,f)$ of a current frame test pixel and a predicted intensity value $\hat{I}(x,y,f)$ for that test pixel by an autoregression process using an autoregression model involving the intensity values of pixels in a zone containing the test pixel and located in both the current frame and in substantially the same zone of a motion compensated frame preceding and succeeding the current frame, comparing the difference to a threshold error value $\epsilon_t$, and flagging the test pixel as damaged when said difference exceeds said threshold error value.

13. A method of detecting a damaged pixel in a current frame f of an image sequence having a plurality of frames, the method comprising evaluating the magnitude of a difference $\epsilon(x,y,f)$ between the actual intensity value $I(x,y,f)$ of a current frame test pixel and a predicted intensity value $\hat{I}(x,y,f)$ for the test pixel by an autoregression process using an autoregression model involving the intensity values of pixels in a zone containing the test pixel and located in both the current frame and in substantially the same zone of a motion compensated frame preceding and succeeding the current frame, comparing the difference to a threshold error value $\epsilon_t$, and flagging the test pixel as damaged when said difference exceeds said threshold error value.

14. A method as claimed in claim 12 wherein the autoregression model has M coefficients, the autoregression process comprising defining for a pixel (x,y,f) in the current frame a support region of M surrounding pixels having intensity values $I_k$ from which a prediction $\hat{I}(x,y,f)$ of the intensity value of a pixel surrounded by those pixels can be made.

15. A method as claimed in claim 14 wherein the said support region contains pixels in the frame directly preceding and the frame directly succeeding the current frame.

16. A method as claimed in claim, 14 wherein there are two of said support regions and one of said support regions comprises only the corresponding pixel in the directly preceding frame and the other said support region comprising only the Corresponding pixel in the directly succeeding frame, so that M=1, and comparing the results obtained by using the two regions.

17. A method as claimed in claim 16 and further comprising setting the coefficient equal to one and generating a forward difference $$\epsilon_f(x,y,f) = I(x,y,f) - I(x,y,f-1)$$

and a backward difference $$\epsilon_b(x,y,f) = I(x,y,f) - I(x,y,f-1)$$

and identifying a pixel as damaged if both the forward and backward errors exceed the threshold value $\epsilon_t$.

18. A method as claimed in claim 14 wherein the prediction is made from a linear weighted sum of the values $I_k$ so that:

$$\hat{I}(x,y,f) = \sum_{k=1}^{M} a_k I_k$$

and wherein there is the step of choosing the coefficients $a_k$ to minimise a function of the prediction error $\epsilon$ over a data volume surrounding the damaged pixel, where;

$$\epsilon(x,y,f) = I(x,y,f) - \hat{I}(x,y,f).$$

19. A method as claimed in claim 18 wherein the function to be minimised is the mean value over the data volume of the squared prediction error $\epsilon$ for each pixel within the volume.

20. A method as claimed in claim 12 comprising additionally the step of identifying as damaged those pixels in the current frame which are in the locality of the detected damaged pixels.

21. A method as claimed in claim 20 wherein the pixels additionally identified are those pixels which are adjacent to the detected damaged pixels.

22. A method as claimed in claim 2 wherein step (a) comprises: estimating the image displacement between two frames by calculating the mean absolute error $MAE_0$ between a block in a first of the frames and a block in the corresponding location in the second of the frames, calculating the mean absolute error $MAE_m$ between the first block in the first frame and a plurality of blocks of a search region of m blocks in the second frame and which region contains the second block and each of the m blocks being offset from the second block in the second frame; identifying which of said plurality of searched blocks of the search region in the second frame gives rise to the minimum $MAE_m(MAE_{min})$ and assigning to the first block, in the first frame, a displacement vector corresponding to said offset of the identified block.

23. A method according to claim 22 wherein said displacement vector corresponding to said offset is only assigned to the first block when $r*MAE_{min} \leq MAE_0$, where r is a constant greater than 1, else a zero displacement vector is assigned.

24. A method of estimating image displacement between two frames of an image sequence, wherein each frame comprises pixels defining image intensity values and of predetermined resolution, the method comprising the steps of:
(a) generating for each frame L0 at least one sub-level Ln of reduced resolution, thus to provide n+1 levels L0 to LN of first and second frames of successively reducing resolution;
(b) take the level Ln of lowest resolution;
(c) divide each of the first and second frames so taken into a plurality of blocks;
(d) determine displacement vectors for the blocks of the first of the two frames relative to the blocks of the second of the two frames by:
(d)(i) calculating the mean absolute error $MAE_0$ between the block in the first of the frames and the block in the corresponding location in the second of the frames;
(d)(ii) calculating the mean absolute error $MAE_m$ between the first block in the first frame and a plurality of blocks of a search region of m blocks in the second frame and which region contains the second block and each of the m blocks having an offset from the second block in the second frame;
(d)(iii) identifying which of said plurality of searched blocks of the search region in the second frame gives rise to the minimum $MAE_m(MAE_{min})$; and
(d)(iv) when $r*MAE_{min} \leq MAE_0$, where r is a constant greater than 1, assigning to the first block, in the said first frame, a displacement vector corresponding to said offset of the identified block, else assigning a zero displacement vector;
(e) when the current level is less than L0, take the frames at the next high resolution level and repeating steps (c) and (d), using the displacement vectors already obtained to define said corresponding location in step d(i).

25. A method according to claim 24 wherein a level Ln is generated by passing a low pass filter mask over the preceding level Ln-1 and subsampling the resulting filtered frame in the horizontal and vertical directions.

26. A method according to claim 25 wherein the low pass filter mask has a Gaussian form.

27. A method of restoring a damaged current frame of an image sequence having a plurality of frames, the method comprising:
(a) dividing current frame f into a plurality of blocks containing substantially equal numbers of pixels;
(b) matching said blocks with corresponding blocks in at least one of a preceding frame and a succeeding frame using a motion estimation process to define a displacement vector for each block;
(c) selecting a data volume containing the current frame and a preceding and a succeeding frame;
(d) using a 3-D-autoregression process on said volume and utilizing the displacement vectors to compensate for motion between frames to generate a prediction intensity error for substantially each pixel in the current frame f;
(e) identifying damaged pixels in the current frame by comparing the predicted errors with a threshold error; and
(f) using a 3D-autoregression process involving the intensity values of pixels surrounding identified pixels to obtain corrected values for the identified pixels.

28. A method as claimed in claim 27, wherein step (b) comprises:
estimating the image displacement between two frames by calculating the mean absolute error $MAE_0$ between a block in a first of the frames and a block in the corresponding location in the second of the frames, calculating the mean absolute error $MAE_m$ between the first block in the first frame and a plurality of blocks of a search region of m blocks in the second frame and which region contains the second block and each of the m blocks having an offset from the second block in the second frame; identifying which of said plurality of searched blocks of the search region in the second frame gives rise to the minimum $MAE_m(MAE_{min})$ and assigning to the first block, in the first frame, a displacement vector corresponding to said offset of the identified block, wherein said displacement vector corresponding to said offset is only assigned to the first block when $r*MAE_{min} \leq MAE_0$, where r is a constant greater than 1.

29. A method as claimed in claim 28, wherein steps (d) and (e) comprise:
evaluating the magnitude of the difference $\epsilon(x,y,f)$ between the actual intensity value $I(x,y,f)$ of a current frame test pixel and a predicted intensity value $\hat{I}(x,y,f)$ for that test pixel by an autoregression process using an autoregression model involving the intensity values of pixels in a zone containing the test pixel and located in both the current frame and in substantially the same zone of a motion compensated frame preceding and succeeding the current frame, comparing the difference to a threshold error value $\epsilon_t$, and flagging the test pixel as damaged when said difference exceeds said threshold error value $\epsilon_t$.

30. A method as claimed in claim 27, wherein step (f) comprises:
forming a prediction error $\epsilon$ over a data volume surrounding each identified pixel, wherein the function to be minimized is the mean value over said data volume of the squared prediction error $\epsilon$ for each pixel within said volume.

* * * * *